United States Patent Office 2,812,247
Patented Nov. 5, 1957

2,812,247

COMPOSITIONS AND METHODS FOR INFLUENCING THE GROWTH OF PLANTS

Hans Gysin, Basel, and Enrico Knusli, Riehen, near Basel, Switzerland, assignors to J. R. Geigy A. G., Basel, Switzerland, a Swiss firm No Drawing. Application December 14, 1953, Serial No. 398,186

Claims priority, application Switzerland September 2, 1953

18 Claims. (Cl. 71—2.3)

The present invention is concerned with compositions which, due to their content of O-phenyl carbamates, change or regulate the development of plant cells and so influence the growth of plants. It is also concerned with a method by which the growth characteristics of plants can be modified by the use of the active substances mentioned above.

It is known that N-phenyl carbamates of the general formula:

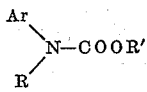

wherein R represents hydrogen or a low molecular alkyl radical, R' represents an alkyl group and Ar represents a phenyl radical substituted or unsubstituted as desired, have attained great importance because of their selective action as weed killers. Reference is made in this respect to N-phenylisopropyl carbamate (IPC) and N-(3-chlorophenyl)-isopropyl carbamate (CIPC).

Surprisingly, it has now been found that O-phenyl carbamates of the general formula:

Am—CO—O—Ar wherein Ar represents a phenyl or naphthyl radical unsubstituted or substituted if desired by alkyl, alkoxy or alkylmercapto, amino or substituted amino or nitro groups or by halogen, and Am represents a member selected from the group consisting

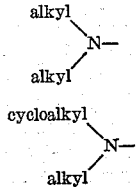

and

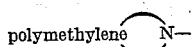

have very marked influence on the growth of plants. Depending on the concentration and formulation as well as the mode of application, by which latter is understood in particular the choice of the time of application and the part of the plant to be treated, the influence on the growth of the plant cannot only be an inhibitory but also a stimulating one. There are therefore, increased possibilities in practical application.

The following useful applications due to stimulating action can be cited:

Promotion of the germination of seeds, of the sprouting of bulbs and rhizomes, of bud shooting, of root growth; inducement and stimulation of the root formation of cuttings; prevention of pre-harvest fall of fruits; enhancement of the effect of manure.

Applications due to inhibitory action are:

Inhibition or delaying of germination and prolongation of the harvest state of vegetables and fruits, in addition; modification of the leaf structure to increase productivity; delaying the blossom; blossom thinning; desiccation of crop plants; defoliation (complete or partial); selective weed killing; total eradication of plants.

In addition, in certain circumstances, parthenogenesis and production of seedless fruits can be attained.

Though several of the reactions listed above can often be attained with the same substance under chosen conditions and in particular, the purely toxic effects leading to the death of the plant can be caused by increasing the concentration, there are naturally differences and preferred indications for the various application purposes which can result even if the action is, in principle, the same, e. g. from the differences in the transportation of the absorbed active substance in the plant.

Dependent on the intended use and the form of application, the concentration of the active ingredient in formulations ready for use can vary within wide limits. High concentrations can be used in particular in dusts for the treatment of the soil and fairly high concentrations from about 0.1–2% can be used for application to a part of the plant only, e. g. for powdering the ends of cuttings the root formation of which is to be stimulated. Low concentrations can be used for example in emulsions in which cuttings are dipped or placed for a longer time to stimulate root formation. Very low concentrations can be used also when the active ingredients are applied to the soil in water (by watering) or in manure. In soil treatment, there is, in general, no necessary relationship between the concentration and the amount of active ingredient taken up by the plant, since a lower concentration of active ingredient can be equalised by increasing the total amount of the agent applied. There is therefore, a very great range of possible concentrations.

Directly dependent on the concentration however, is the amount of active ingredient taken up by the plant when it is applied in aqueous suspensions and emulsions which are sprayed on to the parts of the plant above the ground, in particular on to the leaves, up to the run-off point. The concentration for such agents lies between about 0.01% and 2%. These agents are prepared immediately before use from concentrates, the concentration of active ingredient of which is many times that of the agent to be applied and in cases of concentrates for the preparation of emulsions of liquid active ingredient and for the preparation of suspensions of solid active ingredient, the concentration can be as high as about 90%.

The following compounds for example can be used as active ingredients according to this invention:

(1) O-phenyl dimethyl carbamate _____ B. P.$_{12}$ 130–132°
(2) O - (2 - methyl - phenyl)-dimethyl carbamate _____ B. P.$_{12}$ 143–147°
(3) O - (3.5 - dimethyl-phenyl)-dimethyl carbamate _____ B. P.$_{0.15}$ 98–100°
(4) O - (4 - n - butyl - phenyl)-dimethyl carbamate _____ B. P.$_{12}$ 95–96°
(5) O - (4 - tert. butyl - phenyl)-dimethyl carbamate _____ B. P.$_{0.2}$ 121–123°, M. P. 89–92°
(6) O - (4 - tert. butyl - 2 - methyl - phenyl) - dimethyl carbamate _____ B. P.$_{0.12}$ 108–112°, M. P. 47–48°
(7) O - (2 - n - hexyl - phenyl)-dimethyl carbamate _____ B. P.$_{0.3}$ 117–118°
(8) O - (2 - n - octyl - phenyl)-dimethyl carbamate _____ B. P.$_{0.15}$ 121°

(9) O - (4 - tert. amyl - phenyl)- dimethyl carbamate _____ B. P.₀.₁₅ 117–119°, M. P. 80–84°
(10) O - (2 - chloro - phenyl)- dimethyl carbamate _____ B. P.₁₂ 154–156°
(11) O - (4 - chlorophenyl) - dimethyl carbamate _____ B. P.₀.₂ 118–120°
(12) O - (4 - bromophenyl) - dimethyl carbamate _____ B. P.₀.₁₈ 105°
(13) O - (2.6 - dimethoxy - phenyl)-dimethyl carbamate ___ B. P.₀.₄₅ 135–138°, M. P. 102–103°
(14) O - (2 - nitrophenyl) - dimethyl carbamate _____ M. P. 56–58°
(15) O - (4 - methyl - 3 - nitrophenyl) - dimethyl carbamate _____ M. P. 74–75°
(16) O - (3 - dimethylamino - phenyl) - dimethyl carbamate _____ B. P.₀.₂ 134°
(17) O - α - naphthyl - dimethyl carbamate _____ B. P.₀.₀₅ 118–120°, M. P. 49–50°
(18) O - β - naphthyl - dimethyl carbamate _____ M. P. 92–94°
(19) O - (1 - chloronaphthyl - 2)- dimethyl carbamate _____ B. P.₀.₀₃ 135–137° M. P. 59–60°
(20) O - (2 - chloronaphthyl - 1)- dimethyl carbamate _____ M. P. 102–104°
(21) O - (5 - chloronaphthyl - 1)- dimethyl carbamate _____ M. P. 112°
(22) O - (4 - chloronaphthyl - 1)- dimethyl carbamate _____ B. P.₀.₁₈ 138–140°
(23) O - phenyl - N - methyl - n- butyl carbamate _____ B. P.₀.₂ 112–113°
(24) O - (2 - methyl - phenyl)- N - methyl - n - butyl carbamate _____ B. P.₀.₂ 118–120°
(25) O - (4 - methyl - phenyl)- N-methyl-n-butyl carbamate _____ B. P.₀.₂ 118–121°
(26) O-(4-tert. amyl-phenyl)-N- methyl-n-butyl carbamate__ B. P.₀.₂ 155–156.5°
(27) O - (2 - chlorophenyl) - N- methyl-n-butyl carbamate__ B. P.₀.₂ 135–137°
(28) O - (4 - chlorophenyl)-N- methyl-n-butyl carbamate__ B. P.₀.₃ 128–129°
(29) O - (2.4 - dichlorophenyl)- N-methyl-n-butyl carbamate _____ B. P.₀.₄ 144–146.5°
(30) O - (3 - butoxy - phenyl)- N-methyl-n-butyl carbamate _____ B. P.₀.₂ 148–150°
(31) O-phenyl-diethyl carbamate __ B. P.₁₂ 138–142°
(32) O - (2 - methyl - phenyl)- diethyl carbamate _____ B. P.₁₂ 144–147°
(33) O - (4 - methyl - phenyl)- diethyl carbamate _____ B. P.₁₂ 153°
(34) O - (4 - tert. amyl-phenyl)- diethyl carbamate _____ B. P.₀.₁₅ 144°, M. P. 89–91°
(35) O - (2 - chlorophenyl) - diethyl carbamate _____ B. P.₁₂ 155–157°
(36) O - (2.4 - dichlorophenyl)- diethyl carbamate _____ B. P.₀.₂ 134–135°
(37) O - (4 - methoxy - phenyl)- diethyl carbamate _____ B. P.₀.₄ 129–130°
(38) O - (4 - nitrophenyl) - diethyl carbamate _____ B. P.₀.₁₃ 122°
(39) O - (4 - amino - phenyl)-diethyl carbamate _____ M. P. 64–65°
(40) O - (4 - acetamido - phenyl)-diethyl carbamate _____ M. P. 94°
(41) O - (3 - dimethylaminophenyl)-diethyl carbamate _____ B. P.₀.₀₅ 139–141°
(42) O - α - naphthyl - diethyl carbamate _____ B. P.₁ 172–174°
(43) O - β - naphthyl - diethyl carbamate _____ B. P.₀.₀₀₁ 125–127°
(44) O - phenyl - di - n - butyl carbamate _____ B. P.₀.₀₃ 100–101°
(45) O - (2 - methyl - phenyl)- di-n-butyl carbamate_____ B. P.₀.₁ 144–145°
(46) O - (4 - methyl - phenyl)- di-n-butyl carbamate _____ B. P.₀.₁₄ 126–127°
(47) O-(4-tert. amyl-phenyl)-di- n-butyl carbamate _____ B. P.₀.₀₇ 146–148°
(48) O - (2 - chlorophenyl) - di- n-butyl carbamate _____ B. P.₀.₁ 124–125°
(49) O - (4 - chlorophenyl) - di- n-butyl carbamate _____ B. P.₀.₂ 146–148°
(50) O - (2.4 - dichlorophenyl)- di-n-butyl carbamate _____ B. P.₀.₂ 163–166°
(51) O - phenyl - N - methyl - cyclohexyl carbamate _____ B. P.₀.₁₇ 127°, M. P. 66°
(52) O - (2 - methyl - phenyl)- N-methyl-cyclohexyl carbamate _____ B. P.₁₂ 150–153°
(53) O - (4 - methyl - phenyl)- N-methyl-cyclohexyl carbamate _____ B. P.₀.₁₅ 133–135°, M. P. 64–66.5°
(54) O-(4-tert. amyl-phenyl)-N- methyl - cyclohexyl carbamate _____ B. P.₀.₁₅ 177–179°
(55) O - (2 - chlorophenyl) - N- methyl - cyclohexyl carbamate _____ B. P.₀.₄ 158°
(56) O - (4 - chlorophenyl) - N- methyl - cyclohexyl carbamate _____ B. P.₀.₅ 161–163°
(57) O - (2.4 - dichlorophenyl)- N - methyl - cyclohexylcarbamate _____ B. P.₀.₂ 163–165°
(58) O - phenyl - pentamethylene carbamate _____ M. P. 76–78°
(59) O - (2 - methyl - phenyl)- pentamethylene carbamate__ B. P.₀.₁ 145–146°
(60) O - (4 - methyl - phenyl)- pentamethylene carbamate__ M. P. 86–87°
(61) O-(4-tert. amyl-phenyl)-pentamethylene carbamate ___ B. P.₀.₂ 167–168°
(62) O - (2 -chlorophenyl) - pentamethylene carbamate ____ B. P.₀.₃ 145°
(63) O - (4 - chlorophenyl) - pentamthylene carbamate ____ B. P.₀.₁₈ 139°
(64) O - 2.4 - dichlorophenylpentamethylene carbamate _____ B. P.₀.₀₆ 124°

Some of the carbamates are known. The others can be produced according to methods known per se. Technically suitable in particular is the condensation of reactive carbonic acid derivatives such as e. g. carbamic acid halides or isocyanates with phenols or the reaction of phenol chlorocarbonic esters with amines. Thus for example, p-tert. amyl phenyl dimethyl carbamate can be produced as follows:

186 parts of anhydrous sodium salt of p-tert. amyl phenol are suspended in 600 parts of abs. toluene. 140 parts of dimethyl carbamyl chloride are added dropwise and the whole is boiled for 12 hours under reflux. After cooling, the whole is washed with water and 2 N-caustic soda lye and then distilled. 198 parts of the desired carbamate are obtained. The carbamate boils at 117–190° at a pressure of 0.15 mm. and becomes solid on cooling.

The same compound is obtained by reacting p-tert. amyl phenyl chlorocarbonic acid ester (B. P.13 134–135°) with two equivalents of dimethylamine; analogous carbamates result from the reaction of allyamine, diethylamine, dibutylamine, methyl butylamine, methyl cyclohexylamine and piperidine.

As will be described in the following, p-tert. amyl phenyl dimethyl carbamate is distinguished for its root-forming properties.

As starting materials for the production of other carbamates which according to the invention can be used for influencing plant growth, the following phenols and amines for example are suitable: phenol, 2-cresol, 3-cresol, 4-cresol, dimethyl phenols, isopropyl phenols, 4-n-butyl phenyl, 4-tert. butyl phenol, 4-tert. amyl phenol, 3.5-di-tert. butyl phenol, iso-octyl phenols, nonyl phenol, 4-lauryl phenol, 4-cyclohexyl phenol, guaiacol, 2-ethoxy phenol, 3-methoxy phenol, 4-ethoxy phenol, 3-butoxy phenol, 4-methylmercapto phenol, 4-isoamylmercapto phenol, 2-chlorophenol, 3-chlorophenol, 4-chlorophenol, 2.4-dichlorophenol, 2.5-dichlorophenol, 3.4-dichlorophenol, pentachlorophenol, 4-bromophenol, 2.4.6-tribromophenol, 5-chloro-2-hydroxy toluene, 2-chloro-4-amyl phenol, 4-nitrophenol, 4-aminophenol, 3-dimethylaminophenol, 4-acetylaminophenol, 1-naphthol, 2-naphthol, 5-chloronaphthol-1, 4-chloronapthol-1, 2-chloronaphthol-1, 1-chloronaphthol-2, 1-hydroxy-tetrhydro-(5.6.7.8)-naphthalene, 4-ureidophenol, 4-thioureidophenol, dimethylamine, diethylamine, dipropylamine, di-isopropylamine, dibutylamine, methyl-cyclohexylamine, piperidine.

The active substances can be used in solvents, as emulsions or as dusting agents; the compounding of the active substances depends entirely on the intended use.

Should a stimulating action be required, then naturally auxiliary substances which are as biologically indifferent as possible or are even beneficial, will be chosen; on the other hand if a toxic action is the chief consideration, this can be increased by the choice of carrier substances which themselves have a phytotoxic action.

Solvents such as, in particular, alcohols; ketones such as acetone diacetone alcohol or cyclohexanone; aliphatic hydrocarbons such as kerosene, and cyclic hydrocarbons such as benzene, toluene, xylene, tetrahydronaphthalene, alkylated naphthalenes, also chlorinated hydrocarbons such as tetrachlorethane, ethylene chloride and finally also high boiling organic solvents such as mineral and vegetable oils, or mixtures of the above named substances can be used for the production of solutions.

Chiefly emulsions and dispersions are meant by aqueous forms of application. The substances as such or in one of the above named solvents, are homogeneously incorporated into water, preferably by means of wetting or dispersing agents. On the other hand, concentrates suitable for dilution with water can be produced which consist of active ingredient, emulgator or disperser and possibly, a solvent.

Quaternary ammonium compounds; soap, soft soap, aliphatic sulphuric acid monoesters having long chains, aliphatic aromatic sulphonic acids, alkoxy acetic acids having long chains; polyethylene ethers of fatty alcohols and polyethylene condensation products can be named as examples of cation active, anion active and non-ionogenic emulgating or dispersing agents respectively.

Dusting agents can be made simply by mixing or grinding together the active ingredient and a solid carrier. As such solid carriers can be named: talcum, diatomaceous earth, kaolin, bentonite, calcium carbonate, boric acid, tricalcium phosphate, also powdered wood, powdered cork, charcoal and other materials of vegetable origin. On the other hand the substances can also be drawn on to the carriers by means of a volatile solvent. Pulverulent preparations and pastes can be suspended in water by the addition of wetting agents and protective colloids and so used as spraying agents.

The various forms of application can be adapted to the intended use in the usual way by the addition of substances which improve the distribution, the adhesive properties, resistance to rain and, possibly, the penetrating powers. Such substances are, for example, fatty acids, resins, wetting agents, glue, casein or alginates. In the same way, the biological activity can be increased by the addition of substances which have a bactericidal or fungicidal action or of substances which also influence the growth of plants. Manures may also be added.

A few chosen examples follow which illustrate the range of application described above. The results obtained are also given.

Example 1

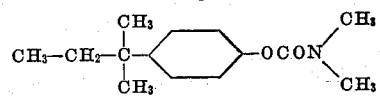

15 cuttings from *Ligustrum ovalifolium* were kept for 48 hours in an emulsion containing 200 p. p. m. active ingredient. They were then planted in sand and kept for 3 weeks in a greenhouse. At the end of this time, 13 cuttings had a total of 136 roots of an average length of 1.6 cm.; 2 cuttings had sprouted no roots. Of the controls, only 1 cutting had a root 0.1 cm. long, 14 had sprouted no roots.

A mixture of 1% of active ingredient and 99% carrier, e. g. talcum was applied to 10 cuttings from *Juniperus horizontalis* which were afterwards planted in sand. After 5 weeks, 8 cuttings had a total of 28 roots of an average length of 3.06 cm.; 2 had sprouted no roots. Of the 10 controls, 3 cuttings had 6 roots of an average length of 1.63 cm., 7 had sprouted no roots.

The cuttings were then planted again. After another 11 weeks all the treated cuttings showed good top growth and an excellent growth of roots. Of the controls, 60% had died, and the remaining 40% had good growing points—and fair growth of roots.

Example 2

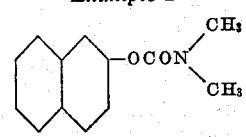

10 cuttings from *Chamaecyparis pisifera plumosa* were treated with a mixture of 2% of active ingredient and 98% carrier. After 5 weeks all the cuttings had together 60 roots of an average length of 1.65 cm. Of the controls, 4 cuttings had 31 roots of an average length of 1.48 cm., 4 had no roots and 2 had died.

Example 3

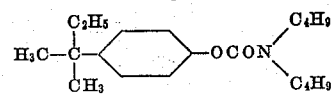

Soya beans dipped in 15 ccm. of an emulsion containing 0.5% of active ingredient sprouted roots just over the place dipped.

The following compounds were found to have a similar stimulating action on the root formation of various test plants: O-(2-chlorophenyl)-dibutyl carbamate and O-(4-methyl-phenyl)-N-methyl-N-cyclohexyl carbamate.

Example 4

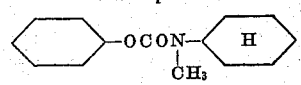

Soya bean plants 2 weeks old sprayed with an emulsion containing 1% of active ingredient lost all their leaves in 3 days.

Example 5

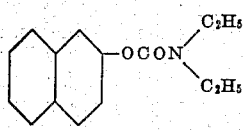

Soya bean plants 2 weeks old sprayed with an emulsion containing ½% of active ingredient lost all their leaves in 7 days.

O-(2.4-dichlorophenyl)-pentamethylene carbamate, for example, has a similar action.

Example 6

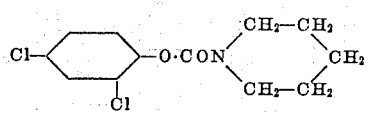

25–50 seeds on filter paper in petri dishes were treated with 5 ccm. of an emulsion containing 0.1% of active ingredient. Observation of the percentage of germinating seeds and of the top growth and root growths showed the following results (10=normal growth, 0=no growth):

Radish _____ 7.06
Cucumber _____ 4.99
Rye grass _____ 0

The following compounds for example have a similar selective inhibitory action on the germination and growth of plants: O-phenyl-dibutyl carbamate and O-(α-naphthyl)-dimethyl carbamate.

In field trials in which 0.1 liter of a 0.5% emulsion of O-(2.4-dichlorophenyl)-pentamethylene carbamate was sprayed per square meter, barley was severely damaged while clover, mustard and galium were only slightly influenced.

What we claim is:

1. A method of influencing the growth of plants which comprises treating the plants with a compound of the formula:

Am—CO—O—Ar wherein Ar represents an aryl radical substituted by a member selected from the group consisting of halogen, alkyl, alkoxy, alkylmercapto, amino, substituted amino and nitro groups, and Am represents a member selected from the group consisting of

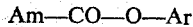

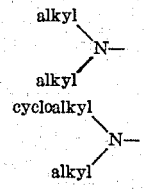

and

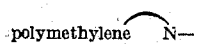

in an amount and concentration sufficient to influence the growth of plants.

2. A method of stimulating the growth of plants which comprises treating the plants with a compound as defined in claim 1 in an amount and concentration sufficient to influence the growth of plants.

3. A method of stimulating the root growth of plants which comprises treating the plants with a compound as defined in claim 1 in an amount and concentration sufficient to stimulate the root growth of plants.

4. A method of inducing and stimulating the root formation of plant cuttings which comprises treating the plant cuttings with a compound as defined in claim 1 in an amount and concentration sufficient to stimulate the root formation of plant cuttings.

5. A method of inducing and stimulating the root formation of plant cuttings, which comprises treating the plant cuttings with O-(4-tert. amyl-phenyl)-dimethyl carbamate in an amount and concentration sufficient to induce and stimulate the root formation of plant cuttings.

6. A method of stimulating the growth of the above ground part of plants which comprises treating the plants with a compound as defined in claim 1 in an amount and concentration sufficient to stimulate the growth of the above ground part of plants.

7. A method of inhibiting the growth of plants which comprises treating the plants with a compound as defined in claim 1 in an amount and concentration sufficient to inhibit the growth of plants.

8. A method of desiccating crop plants which comprises treating the plants with a compound as defined in claim 1 in an amount and concentration sufficient to desiccate crop plants.

9. A method of defoliating crop plants which comprises treating the plants with a compound as defined in claim 1 in an amount and concentration sufficient to defoliate crop plants.

10. A method of inhibiting weed growth without influencing the growth of the crop plant which comprises treating the plant crop with a compound as defined in claim 1 in an amount and concentration sufficient to inhibit weed growth without influencing the growth of the crop plant.

11. A method of killing plants of all kinds where no vegetation is wanted which comprises treating the plants with a compound as defined in claim 1 in an amount and concentration sufficient to kill plants of all kinds.

12. A composition for inducing and stimulating the formation of roots of plant cuttings, comprising O-(4-tert. amyl-phenyl)-dimethyl carbamate in an amount and concentration sufficient to induce and stimulate the formation of roots of plant cuttings, and a solid powder.

13. A plant growth influencing composition comprising a compound of the formula

Am—CO—O—Ar wherein Ar represents an aryl radical substituted by a member selected from the group consisting of halogen, alkyl, alkoxy, alkylmercapto, amino, substituted amino and nitro groups, and Am represents a member selected from the group consisting of

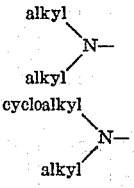

and

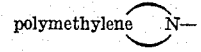

in an amount and concentration sufficient to influence the growth of plants, with a solid powder as carrier.

14. A plant growth influencing composition comprising a compound of the formula

Am—CO—O—Ar wherein Ar represents an aryl radical substituted by a member selected from the group consisting of halogen, alkyl, alkoxy, alkylmercapto, amino, substituted amino and nitro groups, and Am represents a member selected from the group consisting of

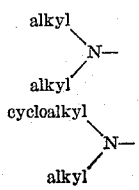

and

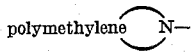

in an amount and concentration sufficient to influence the growth of plants, with a surface active agent as carrier.

15. A plant growth influencing composition comprising a compound of the formula

Am—CO—O—Ar wherein Ar represents an aryl radical substituted by a member selected from the group consisting of halogen, alkyl, alkoxy, alkylmercapto, amino, substituted amino and nitro groups, and Am represents a member selected from the group consisting of

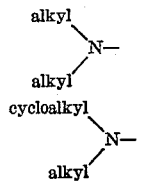

and

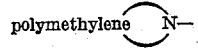

in an amount and concentration sufficient to influence the growth of plants, with a high boiling organic solvent as carrier.

16. A plant growth inhibiting composition comprising a compound of the formula

Am—CO—O—Ar wherein Ar represents an aryl radical substituted by a member selected from the group consisting of halogen, alkyl, alkoxy, alkylmercapto, amino, substituted amino and nitro groups, and Am represents a member selected from the group consisting of

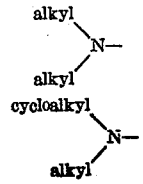

and

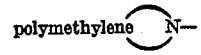

in an amount and concentration sufficient to inhibit the growth of plants, with a solid powder as carrier.

17. A plant growth inhibiting composition comprising a compound of the formula

Am—CO—O—Ar wherein Ar represents an aryl radical substituted by a member selected from the group consisting of halogen, alkyl, alkoxy, alkylmercapto, amino, substituted amino and nitro groups, and Am represents a member selected from the group consisting of

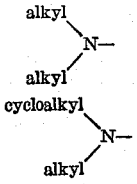

and

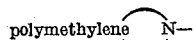

in an amount and concentration sufficient to inhibit the growth of plants, with a surface active agent as carrier.

18. A plant growth inhibiting composition comprising a compound of the formula

Am—CO—O—Ar wherein Ar represents an aryl radical substituted by a member selected from the group consisting of halogen, alkyl, alkoxy, alkylmercapto, amino, substituted amino and nitro groups, and Am represents a member selected from the group consisting of

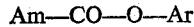

and

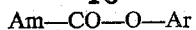

in an amount and concentration sufficient to inhibit the growth of plants, with a high boiling organic solvent as carrier.

References Cited in the file of this patent

UNITED STATES PATENTS

| | | |
|---|---|---|
| 2,208,485 | Aeschlimann | July 16, 1940 |
| 2,493,710 | Aeschlimann et al. | Jan. 3, 1950 |

OTHER REFERENCES

Thompson et al.: "New Growth-Regulating Compounds, a Summary of Growth Inhibitory Activities of Some Organic Compounds as Determined by Three Tests," Botanical Gazette, vol. 107 (1946), pages 475 to 507.

Freed: "Correlation of Certain Physical Constants of Some Alkyl Esters of n-Phenyl Carbamic Acid With Their Phytotoxicity," Science, vol. III (Mar. 17, 1950), pages 285 and 286.

J. Am. Chem. Soc., vol. 69, No. 3, Mar. 1947, pages 718 to 722.

Templeman et al.: Nature, vol. 156, Nov. 24, 1945, page 630.